Jan. 20, 1970 I. A. LESK 3,490,141

HIGH VOLTAGE RECTIFIER STACK AND METHOD FOR MAKING SAME

Filed Oct. 2, 1967

INVENTOR
Israel A. Lesk
BY
Mueller, Aichele, & Rauner
Atty's

United States Patent Office 3,490,141
Patented Jan. 20, 1970

3,490,141
HIGH VOLTAGE RECTIFIER STACK AND METHOD FOR MAKING SAME

Israel Arnold Lesk, Scottsdale, Ariz., assignor to Motorola, Inc., Franklin Park, Ill., a corporation of Illinois Filed Oct. 2, 1967, Ser. No. 672,270
Int. Cl. B01j *17/00;* H01l *1/16*
U.S. Cl. 29—577 5 Claims

ABSTRACT OF THE DISCLOSURE

Disclosed is a high voltage rectifier stack and method of making same wherein a plurality of unencapsulated diodes are bonded to a corresponding plurality of conductive support members of a lead frame. The diodes are then serially connected by wire bonding each diode to an adjacent conductive support member, whereafter the lead frame is encapsulated in plastic. Next, the conductive support members are severed from a continuous member of the lead frame to thereby form a unitary structure from which a desired number of diodes may be selected for a given high voltage rectifier application.

BACKGROUND OF THE INVENTION

This invention relates generally to high voltage rectifiers and more particularly to a plastic encapsulated high voltage rectifier stack and method for making same.

Previously, if it was desired to use a number of diodes for a given high voltage rectifier application, it was necessary to initially select encapsulated dice and thereafter connect a predetermined number of these dice in series to provide a given voltage breakdown value when the dice, i.e., diodes, were biased to reverse breakdown. To complete the high voltage rectifier assembly it was customary to further encapsulate the entire series connection of individually encapsulated diodes in an insulating material. The total construction of a rectifier stack using the above-described prior art method involve the initial encapsulation of the individual semiconductor dice and a second encapsulation step required to complete the finished rectifier stack. Not only is the above-described prior art process expensive, but the resultant high voltage rectifier stack produced thereby affords only one choice of voltage once the stack has been completed.

SUMMARY OF THE INVENTION

An object of this invention is to provide a new and improved high voltage rectifier stack and method for making same.

Another object of this invention is to provide a simple and economical method of making a high voltage rectifier stack.

Another object of this invention is to provide a new and improved high voltage rectifier stack which affords a selection of breakdown (operating) voltage once the stack has been completed.

A feature of this invention is the use of unencapsulated dice in the process of construction a novel high voltage rectifier stack, thereby maintaining dice processing prior to stack formation at a minimum.

Another feature of this invention is a process of the type described which includes both die bonding and wire bonding to serially connect unencapsulated diodes on a lead frame.

Another feature of this invention is a method of making a high voltage rectifier stack in which a repetitive series of steps is used for bonding diodes to a lead frame.

Another feature of this invention is the application of an inner plastic molding to the high voltage rectifier stack; a plurality of leads extend through this molding and may be contacted for voltage measurement.

Another feature of this invention is a final or outer plastic molding which may be used to encapsulate the inner plastic molding so that only terminal leads are exposed for electrical connection.

Another feature of this invention is the provision of silk screened or ceramic equalizing resistors and/or capacitors which are constructed on a ceramic strip attached to the leads protruding from the inner plastic molding. These passive components may be connected in parallel with the diodes in order to prevent excessive voltage from appearing across any one diode in the stack.

IN THE DRAWINGS

BRIEF DESCRIPTION OF THE INVENTION

Briefly described, the present invention is directed to a high voltage rectifier stack and method for making same in which a plurality of semiconductor diodes are die bonded to a corresponding plurality of conductive support members of a lead frame. The diodes are serially connected by wire bonding, whereafter the conductive members of the lead frame are encapsulated in an inner plastic molding. The conductive members are then severed from a continuous member of the lead frame. After the series connection of diodes is electrically tested, the number of diodes required for a desired operating voltage is selected and severed from the rest. The package described thus far is provided with external electrical connections and encapsulated in a final, outer plastic molding to complete the rectifier package.

DESCRIPTION OF PREFERRED EMBODIMENT

Figure 1:
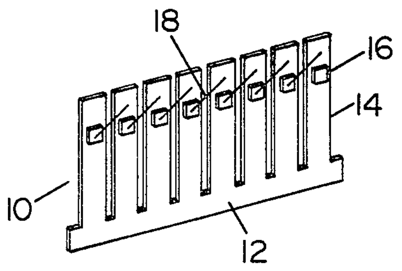
FIG. 1 illustrates a lead frame upon which a plurality of unencapsulated semiconductor diodes have been die bonded and serially connected via bonded wires.
Figure 2:
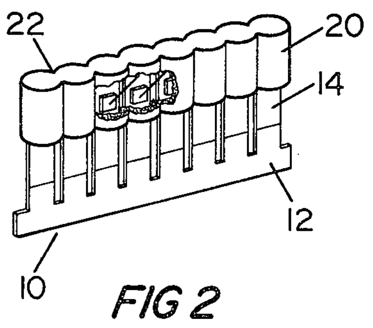
FIG. 2 shows the conductive members of the lead frame supporting the diodes and encapsulated by an indented, plastic molding.

Referring in more detail to the accompanying drawing, there is shown in FIG. 1 a lead frame 10 having a continuous frame member 12 and a plurality of conductive support members 14 extending substantially perpendicular to the continuous frame member 12. The initial step in the process according to invention is to die bond a plurality of semiconductor dice (diodes) 16 to the conductive support members 14 as shown in FIG. 1, and these diodes may be bonded either simultaneously or separately to the lead frame 10. The art of die bonding is well known, and for a more complete discussion of the subject of die bonding and wire bonding, reference can be made to Warner et al., Integrated Circuits, Design Principles and Fabrication, Motorola Series in Solid State Electronics, 1965, and specifically Chapter 14 thereof.

After the diodes 16 have been firmly bonded to lead frame 10 as shown in FIG. 1, a plurality of wires 18 are bonded from each of the diodes 16 to an adjacent conductive support member 14 to thereby connect all of the diodes 16 in series.

After the above wire bonding step, end portions of the conductive support members 14 are encapsulated in an inner plastic molding 20 in order to insulate the diodes 16 and to provide a package for the rectifier stack. The plastic molding 20, which is referred to herein as the inner plastic molding, may be used as the single insulative casing without further plastic encapsulation.

Before the plastic molding 20 hardens, a plurality of indentations 22 are formed therein to facilitate cutting through the molding 20 to thereby provide a rectifier stack with a desired number of diodes therein. These indentations are made using known processing techniques and preferably while the molding is still hot and in a deformable condition. Alternately, the indentations may be made part of the original mold shape.

Figure 3:
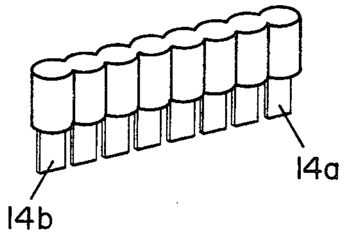
FIG. 3 shows the encapsulated conductive support members of the lead frame after the continuous frame member has been severed therefrom.

Once the plastic molding 20 has been allowed to harden, a cutting tool is used to sever the continuous frame member 12 from the conductive support members 14 and leave the resultant rectifier stack shown in FIG. 3. The protruding ends of the conductive members 14 (FIG. 3) may now be electrically connected to measuring and testing equipment in order to determine the voltage-current characteristics of one or more of the diodes in the rectifier stack. A seven diode stack is utilized for illustration, but much larger stacks are within the capabilities of current molding practice. There is one diode between each two adjacent conductive members 14 in the stack and seven series-connected diodes will undergo reverse breakdown upon the application of a breakdown potential to the extreme conductive members 14*a* and 14*b* in the stack.

Figure 5:
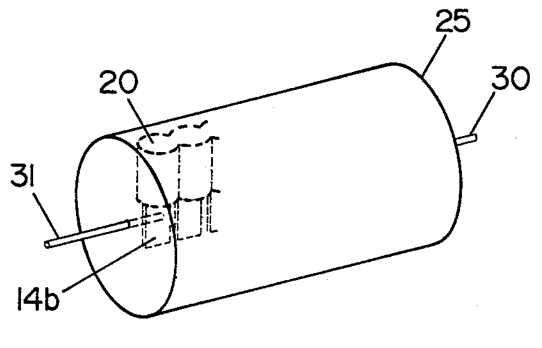
FIG. 5 illustrates the encapsulation of the structure in FIG. 4 with a final, outer plastic molding from which external terminal leads extend.

After the rectifier stack in FIG. 3 has been electrically tested and a desired number of diodes selected for a particular high voltage rectifier application, this group of diodes is severed from the rest of the stack. Terminal leads 30 are soldered to the extreme conductive support members 14*a* and 14*b* of the diode group and the rectifier stack is then encapsulated in an outer plastic molding 25 as shown in FIG. 5. The only external connection to this stack consists of the terminal leads 30 and 31.

Figure 4:
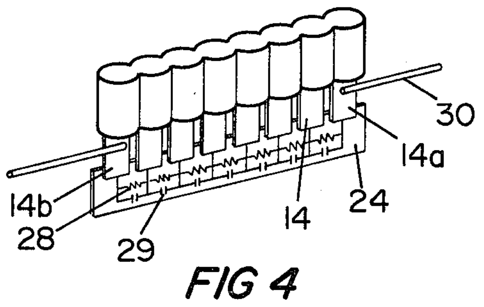
FIG. 4 illustrates the connection of resistors and capacitors to the serially connected diodes in the rectifier stack.

In an alternative embodiment of the invention and prior to encapsulating the rectifier stack shown in FIG. 3 in the outer plastic molding 25, it is frequently desirable to connect resistors and capacitors between diodes. This may be accomplished by attaching a ceramic member 24 to the ends of the conductive support members 14, the ceramic member 24 having thin film resistors 28 and capacitors 29 previously formed thereon. These passive components may be connected in parallel with the diodes 16 as shown in FIG. 4 in order to impart to the rectifier stack a desired electrical characteristic. These resistors and capacitors 28 and 29 prevent excessive voltage from appearing across one or more of the diodes in the stack and may be deposited on the ceramic member 24 using known silk screen techniques. Such techniques are also well known in semiconductor art and are described in the above-identified Warner et al. text; see pages 314 and 321–322 thereof. The resistors 28 and capacitors 29 are thick or thin film components. The resistors 28 may be nichrome, tantalum, or one of the commercially available thick film pastes such as Electro Science Laboratories #6912. The capacitors 29 can be formed using as a dielectric silicon dioxide, tantalum oxide, or one of the commercially available thick film pastes such as Electro Science Laboratories #4110.

The foregoing description of the present invention is directed to an embodiment in which a novel process is used to provide a resultant novel high voltage diode rectifier stack. This rectifier stack may be used for a variety of high voltage rectifier applications, and the choice of voltage may be selected after the stack has been electrically tested as described above with reference to FIG. 3. Accordingly, the invention is limited only by way of the appended claims.

I claim:

1. A method of making a high voltage rectifier stack including the steps of:

(a) providing a lead frame having a continuous frame member and a plurality of conductive support members extending therefrom, (b) bonding a plurality of diodes to said plurality of conductive support members, respectively, (c) bonding a wire from each diode to the adjacent conductive support member to form a series connection between all of said diodes on said support members, (d) encapsulating portions of said conductive support members upon which said diodes are bonded in a dielectric material to form a unitary structure, and (e) severing said continuous frame member from said plurality of conductive support members to thereby leave severed ends of said plurality of conductive support members protruding from the dielectric material, whereby electrical connection can be made to said protruding conductive support members in accordance with the voltage breakdown requirement for a high voltage rectifier application.

2. The method defined in claim 1 which further includes forming indentions in said dielectric material between the serially connected diodes whereby the dielectric material between diodes may be severed in accordance with a selected breakdown voltage provided by a given number of diodes.

3. The method defined in claim 2 which further includes attaching a nonconductive support member to the protruding ends of the conductive support members, said nonconductive support member having passive components and interconnects previously formed on its surface, said passive components being electrically connectable to said conductive support members to prevent excessive voltage from appearing across the diodes.

4. The method defined in claim 2 which further includes:

(a) attaching exterior leads to selected ones of said conductive support members for providing external electrical connections to the series connection of diodes, and (b) encapsulating said unitary structure, said protruding ends of said conductive support members and portions of said exterior leads in a dielectric material thereby providing another larger unitary structure from which only the ends of said exterior leads extend.

5. The method defined in claim 3 which further includes:

(a) attaching exterior leads to selected ones of the support members to provide electrical connections thereto, and (b) encapsulating in a dielectric material said unitary structure, said ends of said protruding conductive support members and portions of said exterior leads to form another larger unitary dielectric structure from which only the ends of said exterior leads extend.

References Cited

UNITED STATES PATENTS

| | | | |
|---|---|---|---|
| 2,804,581 | 8/1957 | Lichtgarn. | |
| 2,994,121 | 4/1961 | Shockley. | |
| 3,076,253 | 2/1963 | Cornelison et al. | |
| 3,080,640 | 3/1963 | Jochems. | |
| 3,391,426 | 7/1968 | Hugill | 29—588 |
| 3,395,447 | 8/1968 | Beyerlein | 29—588 |
| 3,413,713 | 12/1968 | Helda et al. | 29—588 |

PAUL M. COHEN, Primary Examiner

U.S. Cl. X.R.

29—588, 589; 317—234; 321—11